(12) United States Patent
Sasaki et al.

(10) Patent No.: US 6,292,001 B1
(45) Date of Patent: Sep. 18, 2001

(54) CAPACITANCE-TYPE DISPLACEMENT MEASURING APPARATUS

(75) Inventors: Kouji Sasaki, Kawasaki; Nobuyuki Hayashi, Kawasaka, both of (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/407,865

(22) Filed: Oct. 20, 1999

(30) Foreign Application Priority Data

Nov. 13, 1998 (JP) .................................................. 10-324244

(51) Int. Cl.[7] ............................. G01R 27/26; G08C 19/10
(52) U.S. Cl. .......................... 324/662; 324/661; 324/683; 324/686; 324/690; 340/870.37
(58) Field of Search ..................................... 324/662, 686, 324/690, 660, 661, 683; 340/870.37; 33/363 Q (56) References Cited

U.S. PATENT DOCUMENTS

| 4,878,013 | 10/1989 | Andermo . |
| 5,691,646 | * 11/1997 | Sasaki .................................. 324/662 |

FOREIGN PATENT DOCUMENTS

| 0 676 623 A2 | 10/1995 | (EP) . |
| 0 716 290 A2 | 6/1996 | (EP) . |
| 0 831 300 A2 | 3/1998 | (EP) . |

* cited by examiner

*Primary Examiner*—Safet Metjahic
*Assistant Examiner*—Anjan K Deb
(74) *Attorney, Agent, or Firm*—Oliff & Berridge, PLC (57) ABSTRACT

A displacement sensor comprises a first scale (11) and a second scale (12) that are arranged opposing to each other and relatively movable in the measurement axis direction. The first scale (11) includes a transmitting electrode array (13) and a receiving electrode (14). The transmitting electrode array (13) consists of a plurality of transmitting electrode units arranged in a basic period (W1) in the measurement axis direction. Each transmitting electrode unit consists of n transmitting electrodes that are arranged in the measurement axis direction and receive respective phase signals of n-phase transmission signals. The receiving electrode (14) adjoins the transmitting electrode array (13) in the direction perpendicular to the displacement direction. The receiving electrode (14) has a width equal to the basic period (W1) and smaller than a width of the transmitting electrode array (13). The receiving electrode (14) has cut off corners (14a, 14b) at both ends in the width direction and close to the transmitting electrode array. The second scale (12) includes a plurality of coupling electrodes (18) that are formed in the basic period (W1) and capacitively couple with the transmitting electrode array (13) and receiving electrode (14).

8 Claims, 7 Drawing Sheets

CAPACITANCE-TYPE DISPLACEMENT MEASURING APPARATUS

BACKGROUND OF THE INVENTION

1. Field of the Invention

The present invention relates to a capacitance-type displacement detector and measuring apparatus adaptive for a small-sized measuring device such as an electronic micrometer, hole test, angle gauge and slide caliper.

2. Description of the Related Art

A capacitance-type displacement detector with a low power-consumption suitable for downsizing is utilized in a small measuring device such as a slide caliper and semi-cylindrical capacitance-type rotary detector. Such the capacitance-type displacement detector is configured to move two scales relatively to each other in order to measure an amount of a relative movement between both scales by detecting an electrostatic capacitance variation between electrodes arranged on these scales.

Figure 9:
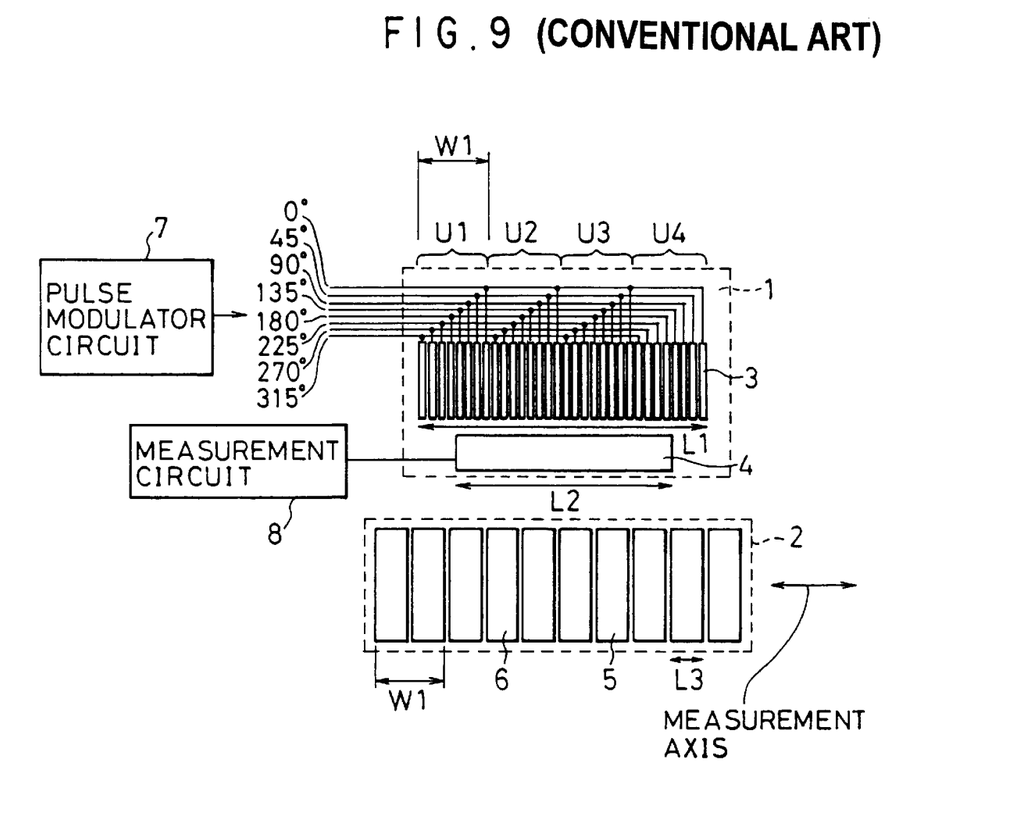
FIG. 9 is a diagram explaining a conventional capacitance-type displacement detector.
Figure 10:
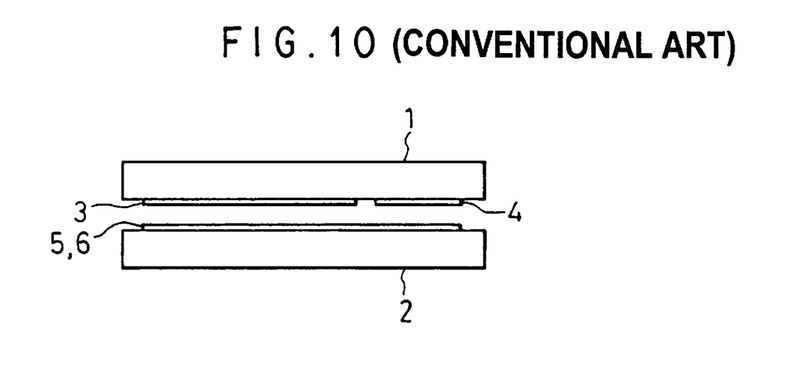
FIG. 10 is a side view of the detector of FIG. 9.

FIGS. 9 and 10 show a rough arrangement of a conventional capacitance-type displacement detector. The detector comprises a first scale 1 and a second scale 2 that are arranged so that they can move relatively to each other, opposing to each other and interposing a certain gap therebetween. Transmitting electrodes 3 and a receiving electrode 4 are formed on the first scale 1. The transmitting electrodes 3 are disposed with a predetermined pitch in the direction of a displacement to be detected. In this example, eight transmitting electrodes define one transmitting electrode unit that corresponds to a basic period (W1), and four such the units U1–U4 define a transmitting electrode array. The receiving electrode 4 is disposed adjacent to the transmitting electrodes 3 in the direction perpendicular to the displacement direction. The receiving electrode 4 comprises a single electrode with a width of L2 shorter than a width of L1 of the transmitting electrode group. Further definitely, the width L2 of the receiving electrode 4 is shorter than the width L1 of the transmitting electrodes 3 by a width of W1 of one transmitting electrode group unit (equal to eight transmitting electrodes 3). Thus, each of both ends of the receiving electrode is located at an inner position by a distance of four transmitting electrodes (W½) from respective both ends of the transmitting electrode group.

Formed on the second scale 2 are coupling electrodes 5 and ground electrodes 6 that capacitively couple to the transmitting electrodes 3 and receiving electrode 4. An arrangement period of the coupling electrode 5 and ground electrode 6 in the displacement direction is coincident with the width of one unit of the transmitting electrodes 3, W1, that is the basic period. Widths of the coupling electrode 5 and ground electrode 6 are set to L/3 that is equal to about a half the basic period.

Supplied to each unit of the transmitting electrodes 3 are eight-phase modulation pulse signals with a 45° out of phase between every two signals output from a pulse modulator circuit 7. A total phase of the modulation pulses received at the coupling electrodes 5 varies in accordance with an amount of a relative displacement in the scale displacement direction between one unit of the transmitting electrodes 3 and the coupling electrodes. Phase information of the modulation pulses received at the coupling electrodes 5 is directly transferred to the receiving electrode 4. The phase information received at the receiving electrode 4 is processed at a measurement circuit 8 in order to obtain an amount of a relative displacement between the first scale 1 and the second scale 2.

As described above, the width L2 of the receiving electrode 4 is set shorter than the width L1 of the transmitting electrode group formed on the first scale 1 in such the capacitance-type displacement detector. This is because capacitive couplings of the transmitting electrode group at both ends with the coupling electrodes 5 are partial and therefore received phases at two receiving electrodes 4 that couple both ends of the transmitting electrode group are discordant with each other. If the width L2 of the receiving electrode 4 is equal to the width L1 of the transmitting electrode group, the discordant phases at both ends may badly affect an accuracy in detecting the amount of the displacement. For this reason, the both ends of the receiving electrode 4 are usually cut off by the width L3 of the coupling electrode 5, respectively, whereby the width L2 of the receiving electrode 4 becomes shorter than the width L1 of the transmitting electrode group. Thus, the receiving electrode 4 may capacitively couple only with the coupling electrodes 5 that exhibit the same received phases for the amount of the scale displacement.

Figure 11:
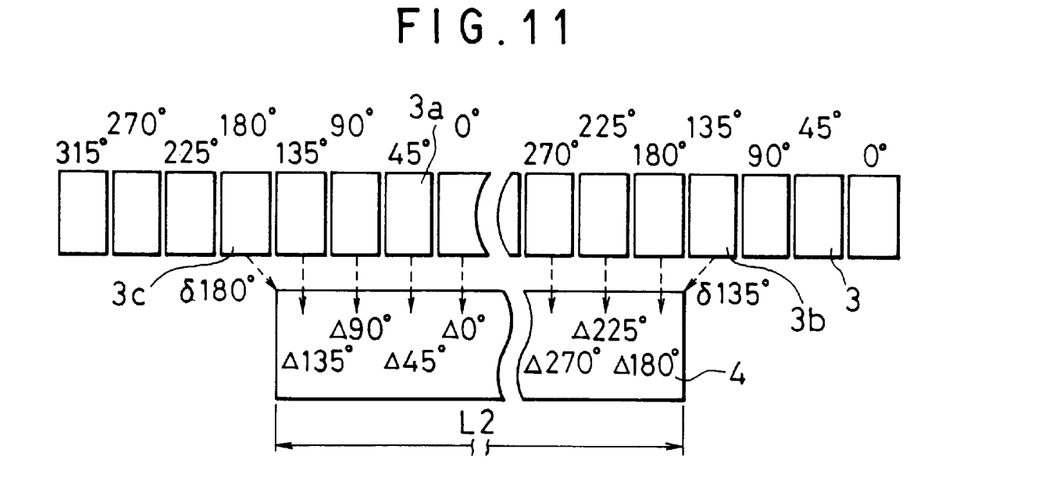
FIG. 11 is a diagram illustrating an electrode pattern in the detector of FIG. 9.
Figure 12A:
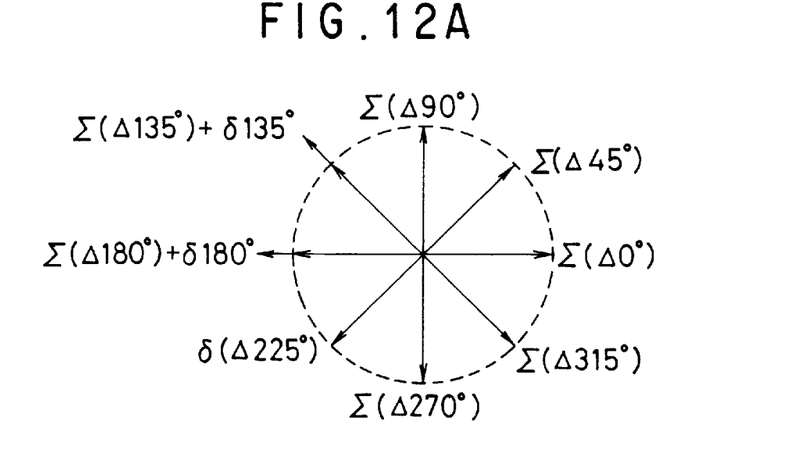
FIGS. 12A and 12B are vector diagrams of noise components in the detector of FIG. 9.
Figure 12B:
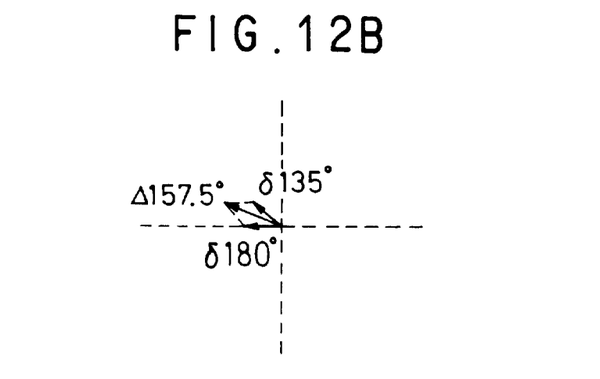

In the above described conventional capacitance-type displacement detector, however, since the transmitting electrode group and receiving electrode 4 have different widths L1 and L2, noise components mixed into the receiving electrode 4 directly from the transmitting electrodes 3 without bypassing the coupling electrodes 5 become unbalanced, affecting a measurement accuracy. FIG. 11 is a diagram, for use in explanation of this matter, which shows enlarged electrode patterns of the transmitting electrodes 3 and receiving electrode 4. Noises with respective phase components $\Delta 0°$, $\Delta 45°$, ..., $\Delta 315°$ from respective transmitting electrodes 3 are mixed into the receiving electrode 4. In addition to the noises from transmitting electrodes 3a that are located within the width L2 of the receiving electrode 4, noises $\delta 135°$ and $\delta 180°$ from transmitting electrodes 3b and 3c that are located outside the width and close to both ends of the receiving electrode 4 may also be mixed into the ends. A vector diagram in FIG. 12A shows these noise components mixed in the receiving electrode 4. FIG. 12B shows a total vector of these noises. If the width L1 of the transmitting electrode group is equal to the width L2 of the receiving electrode 4, the mixed noises $\Delta 0°$–$\Delta 315°$ are cancelled to zero. If L1>L2, however, the presence of the transmitting electrodes 3b and 3c located outside the width L2 of the receiving electrode 4 may generate the mixed noises $\delta 135°$ and $\delta 180°$ which become noise components to be mixed into a measurement value, resulting in a degradation of the S/N ratio.

In order to solve this problem, several methods are employed to improve the S/N ratio in the art, such as:

(1) Increasing the number of the units of the transmitting electrodes 3;
(2) Extending a distance between the transmitting electrodes and the receiving electrode; and
(3) Providing ground electrodes for shielding between the transmitting electrodes and the receiving electrode.

In case of further downsizing the measuring device, however, each of the above methods (1)–(3) may prevent the downsizing. Even if downsizing the measuring device by reducing the number of the units and shortening the distance between the electrodes, therefore, a method capable of effectively reducing the mixed noises between the electrodes has been desired.

SUMMARY OF THE INVENTION

The present invention has been made in consideration of such the situations and has an object to provide a capacitance-type displacement measuring apparatus capable of improving an S/N ratio by effectively reducing mixed noises between transmitting and receiving electrodes while downsizing the apparatus.

The present invention is provided with a capacitance-type displacement measuring apparatus which comprises a first scale and a second scale that are arranged opposing to each other and are relatively movable in the measurement axis direction. Formed on the first scale is a transmitting electrode array consisting of a plurality of transmitting electrode units that are arranged in a basic period in a measurement axis direction. Each transmitting electrode unit consists of n transmitting electrodes that are arranged in the measurement axis direction for receiving respective phase signals of n-phase transmission signals (where n denotes an integer of 2 or more). At least one receiving electrode is disposed on the first scale adjacent to the transmitting electrode array in the direction perpendicular to the measurement axis. A plurality of coupling electrodes is arranged on the second scale in the same period as the basic period in the measurement axis direction so as to capacitively couple with the transmitting electrode units and receiving electrode on the first scale.

The receiving electrode has, in the measurement axis direction, a width equal to an integral multiple of the basic period and smaller than a width of the transmitting electrode array. In the width direction of the receiving electrode, both ends are located inwardly relative to both ends of the transmitting electrode array. Of the both ends of the receiving electrode, at least parts close to the transmitting electrode array are cut off.

In the present invention, of the both ends of the receiving electrode, at least parts close to the transmitting electrode array are cut off. Accordingly, a phase balance between noises mixed into the receiving electrode from the transmitting electrode group can be equalized and an S/N ratio can be finally improved by canceling the mixed noises. If corners of the both ends, in the width direction of the receiving electrode, close to the transmitting electrode array are notched in the form of a circular arc or obliquely, only mixed noise components between the transmitting and receiving electrodes can be reduced, hardly reducing amounts of received signals from the coupling electrodes.

Thus reducing the mixed noises between the transmitting and receiving electrodes can decrease the number of the transmitting electrode units: for example, two transmitting electrode units may be enough to compose the transmitting electrode array. In this case, the receiving electrode may have a width equal to the basic period and be arranged so that the center in the width direction of the receiving electrode meets with the center in the width direction of the transmitting electrode unit. This arrangement can realize a much smaller measuring device.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which:

FIGS. 1A and 1B are diagrams illustrating a semi-cylindrical rotary detector according to an embodiment of the present invention adaptive for an electronic micrometer and the like;

DETAILED DESCRIPTION OF THE PREFERRED EMBODIMENTS

Figures 1A, 1B:
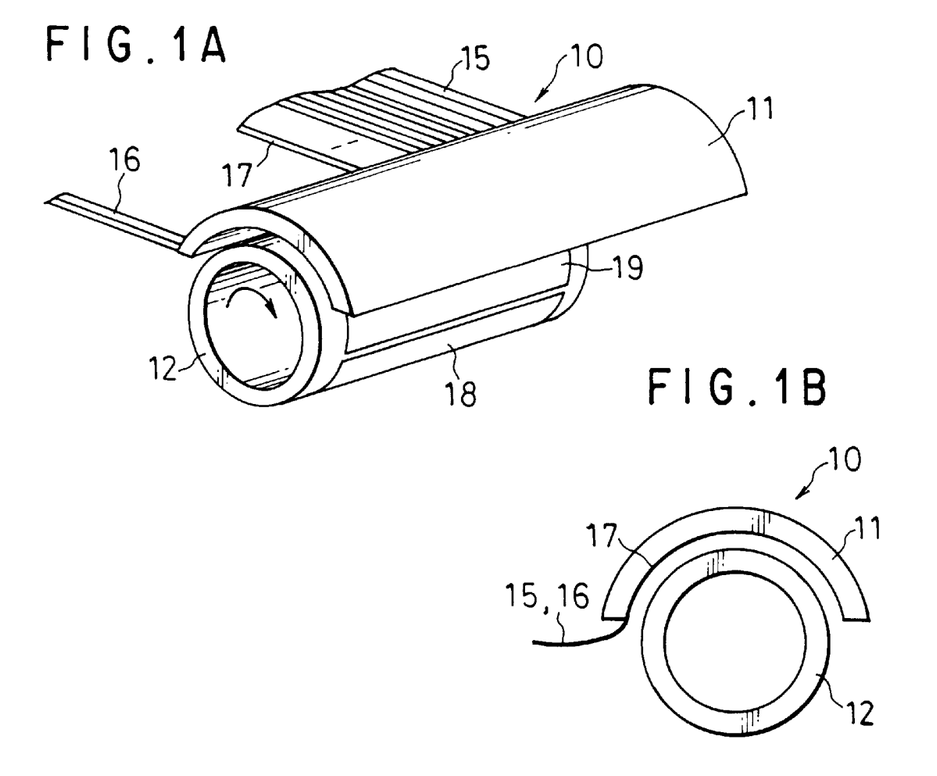

FIGS. 1A and 1B are squint and side views illustrating an arrangement of a rotary encoder 10 adaptive for an electronic micrometer and the like.

The rotary encoder 10 comprises a semi-cylindrical member 11 that is fixed on a stator and the like, and a cylindrical member 12 that is rotationally movable in the circumferential direction together with a rotor and the like. The cylindrical member 12 is arranged in coaxial to the semi-cylindrical member 11, sustaining a certain gap (0.1–0.2 mm) thereto.

Figure 2A:
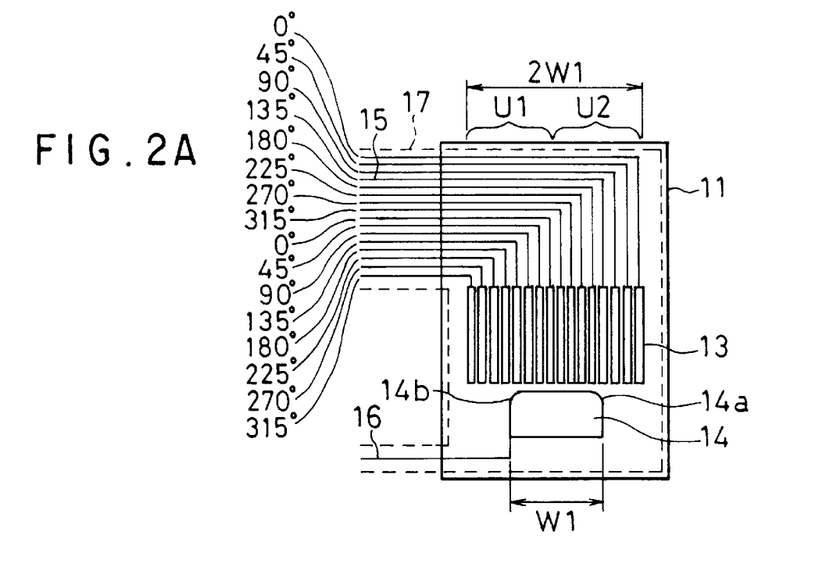
FIGS. 2A and 2B are developed views showing electrodes of the detector of FIG. 1.

The semi-cylindrical member 11 is a first scale and has a transmitting electrode array 13 and a receiving electrode 14 formed on its inner circumferential surface as shown in a developed view of FIG. 2A. In this embodiment, the transmitting electrode array 13 consists of two transmitting electrode units U and U2. Each of the transmitting electrode units U1 and U2 includes eight transmitting electrodes and is disposed with a basic period W1. The whole width of the transmitting electrode array 13 is equal to 2×W1. The receiving electrode 14 has a width W1 that corresponds to the basic period. The receiving electrode 14 is arranged in such a manner as to meet its center with the center of the transmitting electrode array 13. Thus, each of both ends of the receiving electrode 14 is located at an inner position by a distance of four transmitting electrodes from respective both ends of the transmitting electrode array 13. Corners 14a and 14b of both ends of the receiving electrode 14, which are close to the transmitting electrode array 13, are chamfered in the form of a circular arc (R-chamfer). The transmitting electrode array 13 and the receiving electrode 14 are patterned on an FPC (Flexible Printed Circuit) board 17 shown by a dashed line in this embodiment. The FPC board 17 has a single-sided substrate configuration to be bent easily, and is adhered on the inner circumferential surface of the semi-cylindrical member 11. The FPC board 17 also includes lead wires 15 and 16 for these electrode patterns, which are formed integrally together with the electrode patterns. These leads 15 and 16 are drawn out to the external from openings at a side edge portion of the semi-cylindrical member 11. The leads 15 that are connected to the transmitting electrode array 13 are arranged apart from the receiving electrode 14 and lead 16 so as not to introduce any noises mixing into the receiving electrode 14 and the lead 16 connected thereto.

Figure 2B:
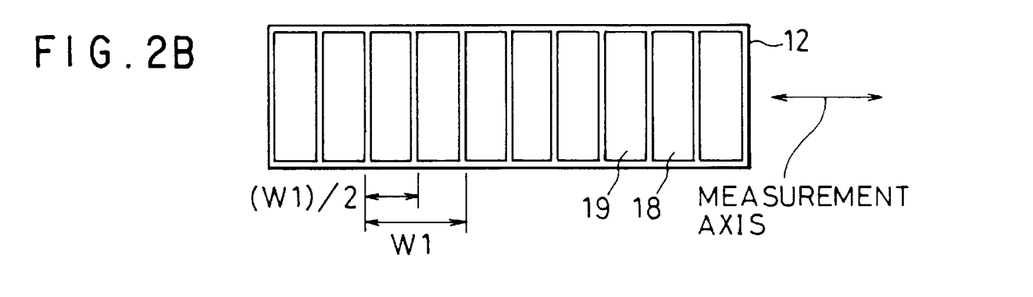

On the other hand, the cylindrical member 12 serves as a second scale and has coupling electrodes 18 and ground electrodes 19 formed alternately in the basic period W1 on its outer circumferential surface as shown in FIG. 2B. Each width of these electrodes is of about a half the basic period W1 (equal to about four transmitting electrodes). In this embodiment, five sets of coupling and ground electrodes 18 and 19 are formed along the outer circumferential surface of the cylindrical member 12. The ground electrodes 19 are provided for the purpose of preventing extra noises from mixing into the receiving electrode 14 but can be omitted if the noises affect less.

Figure 3:
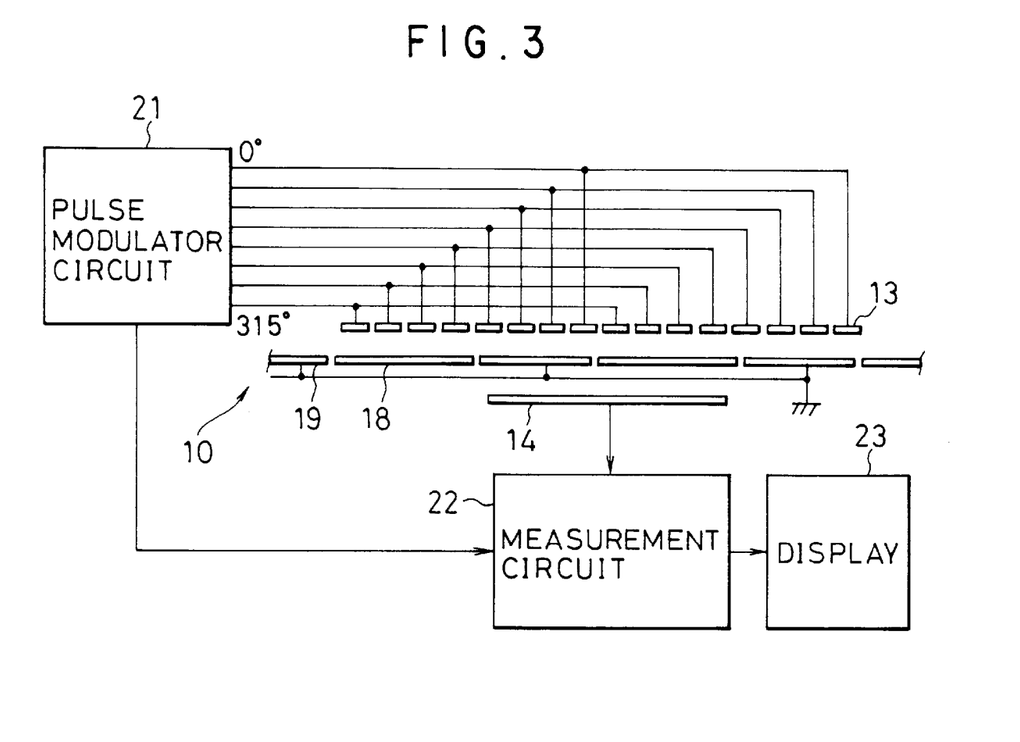
FIG. 3 is a block diagram showing a measuring apparatus using the detector of FIG. 1.

FIG. 3 is a block diagram showing a rough arrangement of a displacement measuring apparatus that utilizes such the capacitance-type displacement detector. Supplied to every eight transmitting electrodes that define a transmitting electrode unit are eight-phase modulation pulse signals with a 45° out of phase between every two signals from a pulse modulator circuit 21 that is a transmission signal generator. Signals transmitted from the transmitting electrodes and received at the receiving electrode 14 through the coupling electrodes 18 are fed into a measurement circuit 22. Also given to the measurement circuit 22 are reference phase signals from the pulse modulator circuit 21. The measurement circuit 22 compares phases of the received signals with phases of the reference phase signals and computes an amount of a displacement between the scales. The resultant computed value is indicated on a display 23.

Figure 4:
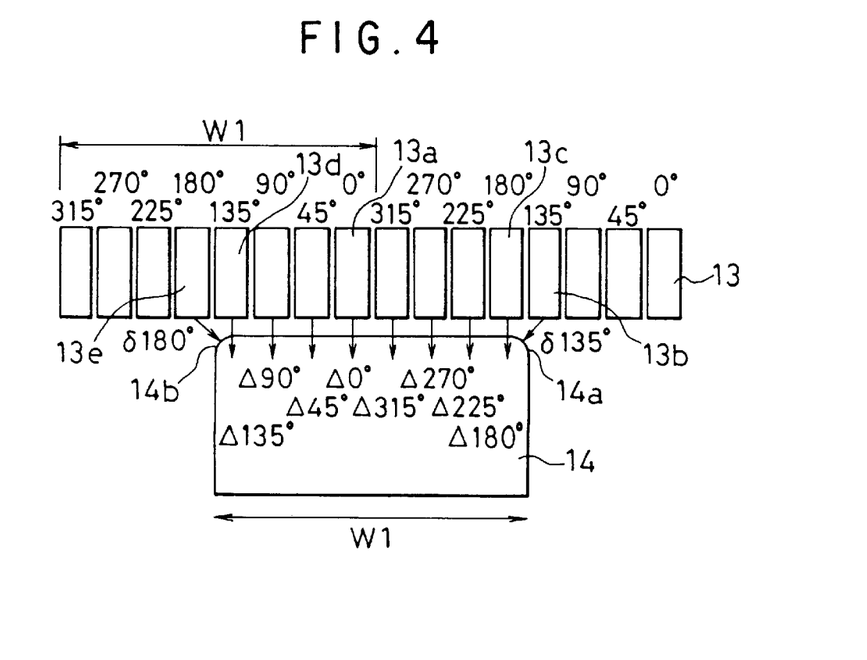
FIG. 4 is a diagram illustrating an electrode pattern of the detector and mixed noises.
Figure 5:
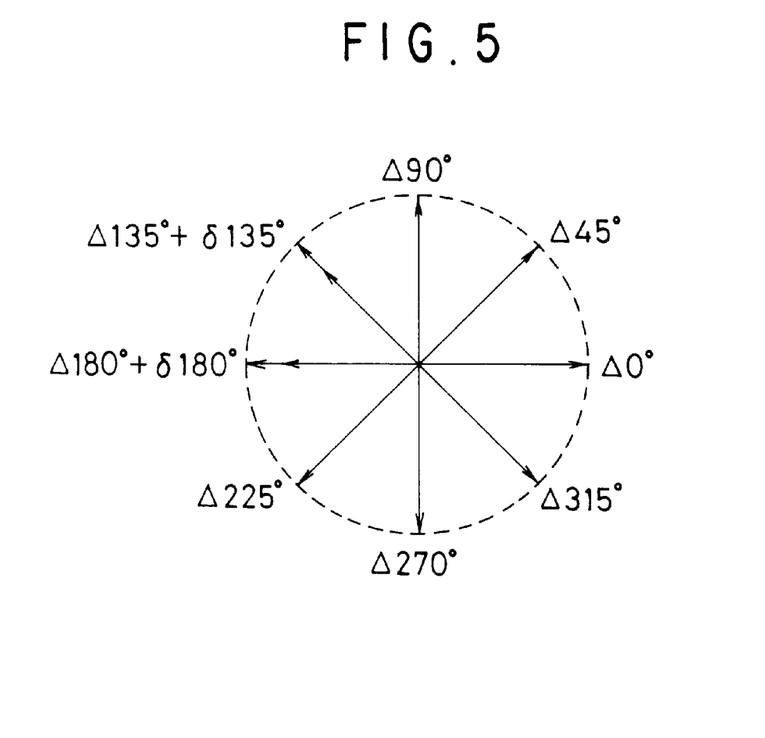
FIG. 5 is a vector diagram of the mixed noises.

FIG. 4 schematically shows main noises mixing into the receiving electrode 14 directly from the transmitting electrode array 13. As depicted in the figure, the corners 14a and 14b of both ends of the receiving electrode 14, which are close to the transmitting electrode array 13, are symmetrically cut off in the form of a circular arc. Therefore, noise components $\delta 135°$, $\Delta 180°$, $\Delta 135°$ and $\delta 180°$ from transmitting electrodes 13b, 13c, 13d and 13e that are close to the corners 14a and 14b are reduced compared to the conventional technology. FIG. 5 shows a vector diagram of the noise components. As obvious from this figure, the noise components mixed into the receiving electrode 14 can be cancelled by adjusting an amount of chamfered corner in such a manner that an amount of received noises at the receiving electrode 14 becomes as follows;

$$\Delta 135° + \delta 135° = \Delta 180° + \delta 180°$$
$$= \Delta 0° = \Delta 45° = \Delta 90°$$
$$= \Delta 225° = \Delta 270° = \Delta 315°$$

On the other hand, original signal components received at the receiving electrode 14 from the transmitting electrode array 13 through the coupling electrodes 18 are hardly reduced by chamfering the corners. Thus, the S/N ratio is improved and the displacement detecting accuracy is increased compared to the conventional technology. Thereby achieving a sufficient measurement accuracy and contributing to downsize the apparatus even if setting two units as the number of the transmitting electrode units as is in this embodiment.

The present invention is, of course, not limited to the embodiment with two units of the transmitting electrodes. Rather, the present invention can generally be adaptive for such a detector that includes a transmitting electrode array consisting of a plurality of transmitting electrode units and a receiving electrode. The receiving electrode has a width shorter than a width of the transmitting electrode array and both ends of the receiving electrode are located inside both ends of the transmitting electrode array.

Figure 6:
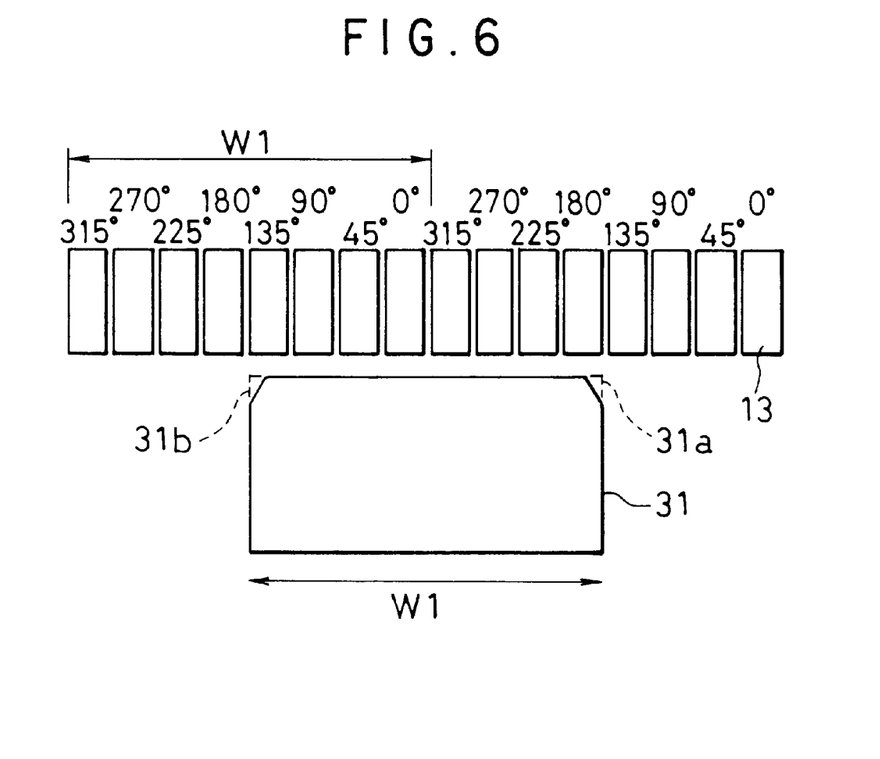
FIG. 6 is a diagram illustrating an electrode pattern of the detector according to another embodiment of the present invention.
Figure 7:
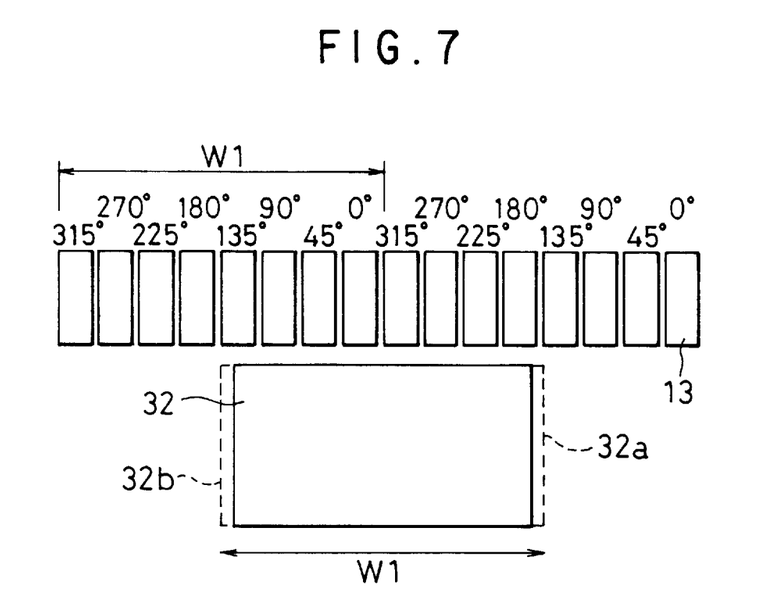
FIG. 7 is a diagram illustrating an electrode pattern of the detector according to a further embodiment of the present invention.

Only the above R-chamfering method does not process the form of the receiving electrode 14. For example, as shown in FIG. 6, a method of chamfering obliquely corners 31a and 31b of a receiving electrode 31 may also attain the same effect (C-chamfer). Alternatively, as shown in FIG. 7, a receiving electrode 14 may be formed short so that corners 32a and 32b of the receiving electrode 32 locate slightly inside the width W1 of the basic period. In this embodiment, although a coupling area with the coupling electrodes 18 is reduced slightly, the pattern itself can be made easily compared to the embodiments of FIGS. 4 and 6.

Figure 8:
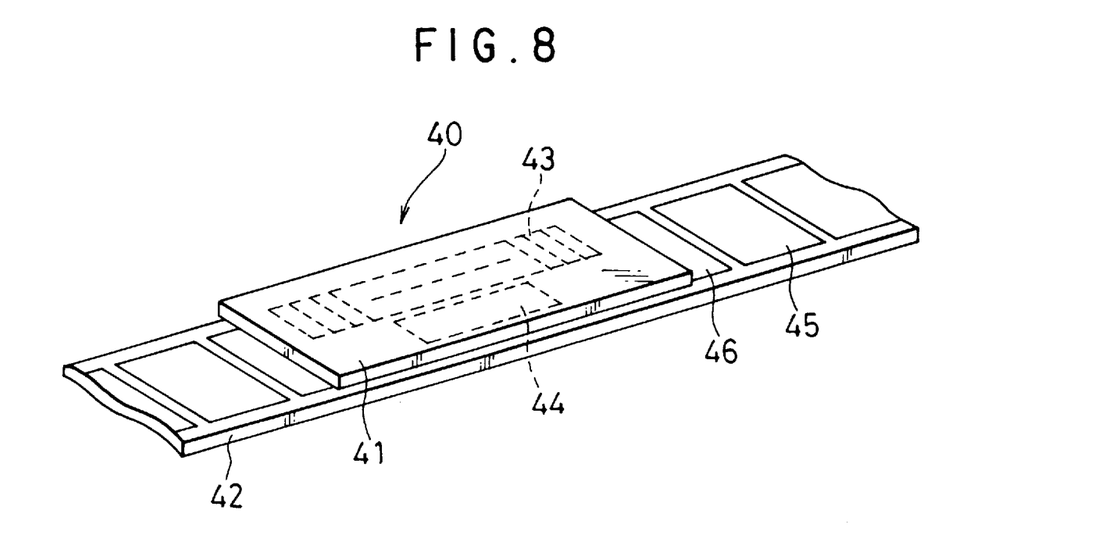
FIG. 8 is a squint view showing an example of a linear displacement detector according to the present invention.

Whereas the examples of the rotary encoders are described in the above embodiments, the present invention can also be applied to a linear encoder (linear displacement detector) for use in a slide caliper and the like as shown in FIG. 8. The linear encoder 40 comprises a first scale 41 consisting of a flat plate, and a second scale 42 opposing thereto and consisting of a flat plate. The first scale 41 includes a transmitting electrode array 43 and receiving electrode 44 formed thereon. The second scale 42 includes coupling and ground electrodes 45 and 46 formed thereon. The receiving electrode 44 is processed to cut off its corners close to the transmitting electrode array 43.

As described above, in the present invention, of the both ends of the receiving electrode, at least parts close to the transmitting electrode array are cut off. Accordingly, a phase balance between noises mixed into the receiving electrode from the transmitting electrode array can be equalized and an S/N ratio can be finally improved by canceling the mixed noises. Thus, downsizing the apparatus and improving the displacement detecting accuracy can be achieved at the same time.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A capacitance-type displacement measuring apparatus, comprising:
    a first scale and a second scale arranged opposing to each other and being relatively movable in a measurement axis direction;
    a transmitting electrode array, formed on said first scale, consisting of a plurality of transmitting electrode units arranged in a basic period in said measurement axis direction, each transmitting electrode unit consisting of n transmitting electrodes arranged in said measurement axis direction for receiving respective phase signals of n-phase transmission signals (where n denotes an integer of 2 or more);
    at least one receiving electrode disposed on said first scale adjacent to said transmitting electrode array in the direction perpendicular to said measurement axis; and
    a plurality of coupling electrodes arranged on said second scale in the same period as said basic period in said measurement axis direction so as to capacitively couple with said transmitting electrode units and receiving electrode on said first scale; wherein
    said receiving electrode has in said measurement axis direction a width equal to an integral multiple of said basic period and smaller than a width of said transmitting electrode array, both ends in the width direction of said receiving electrode being located inwardly relative to both ends of said transmitting electrode array, at least parts of said both ends of said receiving electrode close to said transmitting electrode array being cut off.

2. The capacitance-type displacement measuring apparatus according to claim 1, wherein
in the width direction of said receiving electrode, corners of said both ends close to said transmitting electrode array are cut off in the form of a circular arc.

3. The capacitance-type displacement measuring apparatus according to claim 1, wherein
in the width direction of said receiving electrode, corners of said both ends close to said transmitting electrode array are cut off obliquely.

4. The capacitance-type displacement measuring apparatus according to claim 1, wherein
in the width direction of said receiving electrode, said both ends of said receiving electrode are slightly cut off.

5. The capacitance-type displacement measuring apparatus according to claim 1, wherein
said transmitting electrode array includes two transmitting electrode units, and
said receiving electrode has a width equal to said basic period and is arranged so that the center in the width direction of said receiving electrode meets with the center in the width direction of said transmitting electrode array.

6. The capacitance-type displacement measuring apparatus according to claim 1, wherein
said first scale comprises a semi-cylindrical member having said transmitting electrode array and receiving electrode formed on its inner circumferential surface, and
said second scale comprises a cylindrical member having said coupling electrodes formed on its outer circumferential surface, said second scale being rotatably arranged in coaxial to and apart a certain sustained gap from said semi-cylindrical member, whereby
said first and second scales composes a rotary encoder.

7. The capacitance-type displacement measuring apparatus according to claim 6, wherein
said transmitting electrode array and receiving electrode are formed on a flexible printed circuit board and attached to the inner circumferential surface of said semi-cylindrical member.

8. A capacitance-type displacement measuring apparatus, comprising:
a transmission signal generator for generating n-phase transmission signals (where n denotes an integer of 2 or more);
a capacitance-type displacement sensor including a first scale and a second scale arranged opposing to each other and being relatively movable in a measurement axis direction, said sensor receiving said n-phase transmission signals and outputting received signals with phases according to relative displacements of said n-phase transmission signals; and
a measurement circuit for detecting said phases of said received signals output from said capacitance-type displacement sensor and computing a relative movement between said first and second scales, wherein
said first scale includes a transmitting electrode array and at least one receiving electrode formed on a surface opposing to said second scale, said transmitting electrode array consisting of a plurality of transmitting electrode units arranged in a basic period in said measurement axis direction, each transmitting electrode unit consisting of n transmitting electrodes arranged in said measurement axis direction for receiving respective phase signals of n-phase transmission signals, said receiving electrode being disposed on said first scale adjacent to said transmitting electrode array in the direction perpendicular to said measurement axis and having in said measurement axis direction a width equal to an integral multiple of said basic period and smaller than a width of said transmitting electrode array, both ends in the width direction of said receiving electrode being located inwardly relative to both ends of said transmitting electrode array, at least parts of said both ends of said receiving electrode close to said transmitting electrode array being cut off, and
said second scale includes a plurality of coupling electrodes arranged thereon in the same period as said basic period in said measurement axis direction so as to capacitively couple with said transmitting electrode units and receiving electrode on said first scale.

* * * * *